(12) United States Patent  
Matsumura

(10) Patent No.: US 9,304,720 B2
(45) Date of Patent: Apr. 5, 2016

(54) PRINT JOB MANAGEMENT APPARATUS

(71) Applicant: RISO KAGAKU CORPORATION, Tokyo (JP)

(72) Inventor: Tomoki Matsumura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/080,909

(22) Filed: Nov. 15, 2013

(65) Prior Publication Data

US 2014/0146343 A1 May 29, 2014

(30) Foreign Application Priority Data

Nov. 29, 2012 (JP) ................. 2012-260816

(51) Int. Cl.
*G06K 15/00* (2006.01)
*G06F 3/12* (2006.01)

(52) U.S. Cl.
CPC ............ *G06F 3/1219* (2013.01); *G06F 3/1222* (2013.01); *G06F 3/1238* (2013.01); *G06F 3/1267* (2013.01); *G06F 3/1274* (2013.01); *G06F 3/1285* (2013.01)

(58) Field of Classification Search
USPC .............................................. 358/1.15, 1.13
See application file for complete search history.

(56) References Cited

U.S. PATENT DOCUMENTS

2005/0254080 A1* 11/2005 Kim ............................. 358/1.13
2007/0258108 A1* 11/2007 Matsumoto et al. ......... 358/1.15
2008/0198421 A1* 8/2008 Hirahara et al. ............. 358/403
2011/0030068 A1* 2/2011 Imai .............................. 726/27
2012/0107030 A1* 5/2012 Goto ........................ G06F 3/122
                                                                    400/76
2012/0274964 A1* 11/2012 Kimura ........................ 358/1.13

FOREIGN PATENT DOCUMENTS

JP      2009-230580 A    10/2009

OTHER PUBLICATIONS

Tokuda, Print Job Holding Device, Authentication Printing System, and Print Job Managing Method, Oct. 8, 2009, JP 2009230580 A.*

* cited by examiner

*Primary Examiner* — Martin Mushambo
(74) *Attorney, Agent, or Firm* — Greenblum & Bernstein, P.L.C.

(57) ABSTRACT

A print job management apparatus includes a print job storage unit that stores print jobs with respect to each user, a stored time counter that counts each stored duration time of the print jobs, a threshold value setting unit that sets a warning judgment threshold value, a stored time comparator that judges whether or not the each stored duration time exceeds the warning judgment threshold value by comparing the each stored duration time of the print jobs with the warning judgment threshold value, and a warning unit that provides a warning to a user of a print job when it is judged by the stored time comparator that a stored duration time of the print job exceeds the warning judgment threshold value. According to the print job management apparatus, it can be prevented to erroneously print out a print job(s) stored in a printer for a long time.

8 Claims, 4 Drawing Sheets

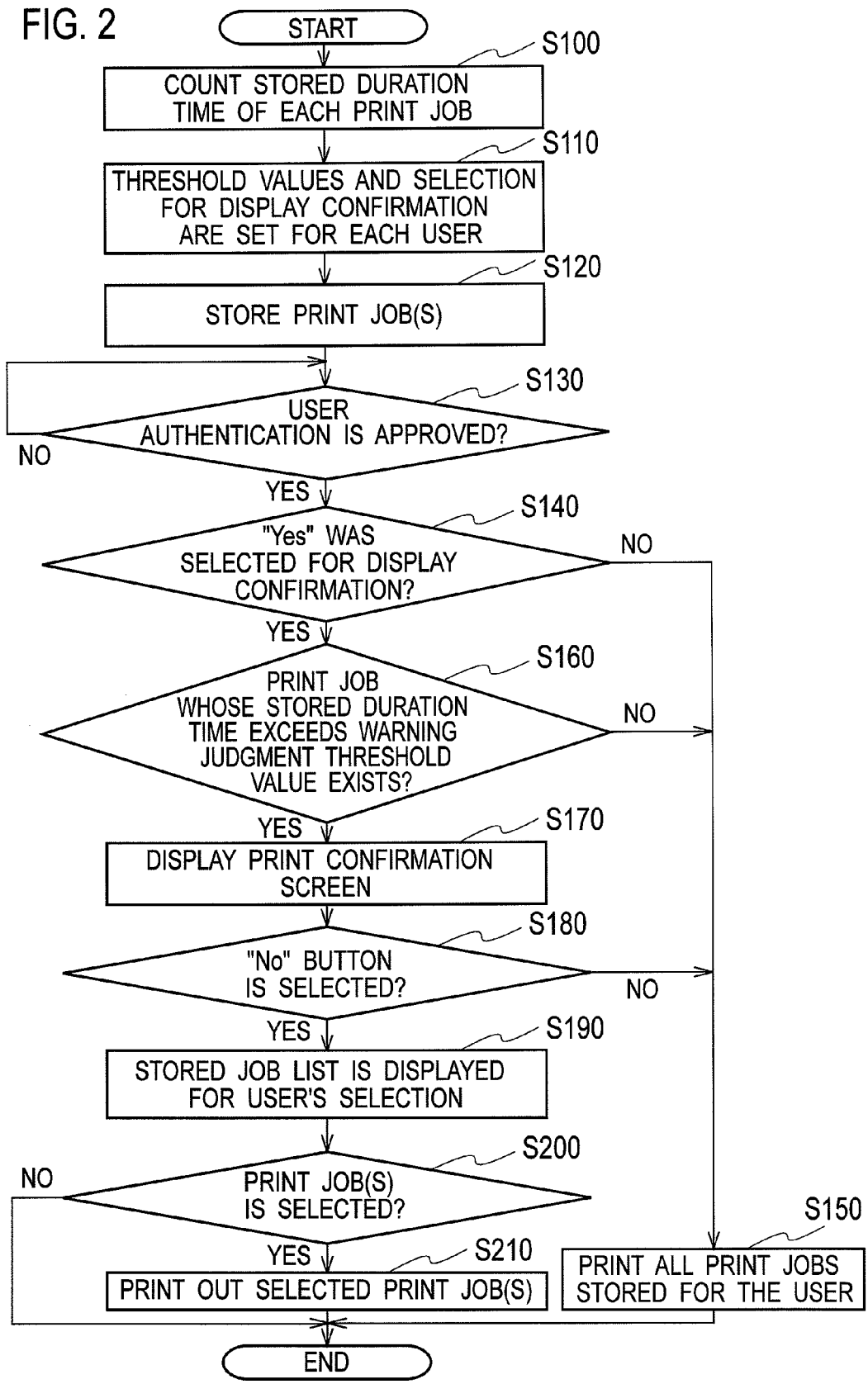

FIG. 3

□ USER SETTING

| | |
|---|---|
| User's Name | [User A] 14a1 |
| Display Confirmation When Printing Stored Job | ○ No  ● Yes   14a2 |
| Warning Judgment Threshold Value | [60] min   14a3 |
| Deletion Judgment Threshold Value | [24] hr   14a4 |

[Cancel] [OK]

[Logout]  User A            Current Time:2012/4/5 18:00

CONFIRMATION

4 print jobs are remained in memory,
and 2 of them are stored longer than 60 min.

- To print out all the print jobs, press "Yes" button.
- Not to print out all the print jobs, press "No" button.
  Selection screen will be opened to select print job(s) to be printed out.

[Yes]   [No]

14b1   14b2

14b

PRINT JOB MANAGEMENT APPARATUS

BACKGROUND OF THE INVENTION

1. Technical Field

The present invention relates to a print job management apparatus that stores a print job(s) generated based on a user's operation in a memory such as a spooler and executes printing of the print job(s) when requested by another user's operation.

2. Background Arts

There is a known print job management apparatus that is installed in a printer to receive a print job(s) sent from a client computer by a user and store the print job(s) in a memory such as a spooler. The print job management apparatus executes printing of the stored print job(s) when a login of the user to the printer is approved.

In such a print job management apparatus, it is required to build security in order to prevent information leakage from printed media made by a print job in a case where the print job is stored in a spooler for a long time. Japanese Patent Application Laid-Open No. 2009-230580 (Patent Document 1) discloses a method for building security. In the method disclosed in the Patent Document 1, a time when a print job generated by a user is stored in a spooler is defined as a reference time for the user. Then, a warning is sent to the user when an elapsed time from the reference time exceeds a threshold duration time. Here, the reference time is updated by a time when another new print job generated by the user is stored in the spooler.

SUMMARY OF THE INVENTION

However, in the print job management apparatus disclosed in the Patent Document 1, a reference time for each user is subject to be updated when another new print job is stored, as explained above. Therefore, if a new print job generated by a user is stored in a spooler when an old print job by the user is remained in the spooler, a reference time is subjected to be updated by a time when the new print job is stored in the spooler. For example, a user sent a print job to a printer and the print job was stored in a spooler at 15:00, and then the user sent another print job to the printer and the other print job was stored in the spooler at 17:00. In this case, the current reference time for the user is 17:00.

Therefore, if a user stores plural print jobs in a spooler of a printer at time intervals, an old printer job may be unfavorably remained in the spooler with no warning to the user even when the old printer job is stored in the spooler longer than the threshold duration time.

Specifically, a user sent a print job to a spooler of a printer and didn't login to the printer (i.e. the print job was not printed out), and, at a later date, the stored and outdated print job is subjected to be printed out when the user logins to the printer in order to print another print job. In this case, print sheets, inks, carbon toner, electricity expense and so on are uneconomically wasted, and the printer may become decrepit fast.

An object of the present invention is to provide a print job management apparatus that can prevent erroneous printing of a print job(s) stored for a long time.

An aspect of the present invention provides a print job management apparatus that includes a print job storage unit that stores print jobs generated based on user's operations with respect to each user; a stored time counter that counts each stored duration time of the print jobs stored in the print job storage unit; a threshold value setting unit that sets a warning judgment threshold value; a stored time comparator that judges whether or not the each stored duration time exceeds the warning judgment threshold value set by the threshold value setting unit by comparing the each stored duration time of the print jobs stored in the print job storage unit with the warning judgment threshold value; and a warning unit that provides a warning to a user of a print job when it is judged by the stored time comparator that a stored duration time of the print job exceeds the warning judgment threshold value. According to the above aspect, it can be prevented to erroneously print out a print job(s) stored for a long time.

It is preferable that the print job management apparatus further includes a user I/F unit that has a display device and the warning unit provides the warning to the user of the print job whose stored duration time exceeds the warning judgment threshold value by displaying, on the display device, the print job whose stored duration time exceeds the warning judgment threshold value in a more intensified manner than a displayed manner of print job whose stored duration time doesn't exceed the warning judgment threshold value. According to this configuration, it is possible for the user to recognize the print job whose stored duration time exceeds the warning judgment threshold value surely, and to select a print job to be printed out with referring to the print job displayed in the intensified manner.

It is preferable that the threshold value setting unit further sets a deletion threshold value, the stored time comparator further judges whether or not the each stored duration time exceeds the deletion threshold value set by the threshold value setting unit by comparing the each stored duration time of the print jobs stored in the print job storage unit with the deletion threshold value; and the warning unit deletes a print job when it is judged by the stored time comparator that a stored duration time of the print job exceeds the deletion threshold value. According to this configuration, it can be prevented more surely to erroneously print out a print job(s) stored for a long time.

BRIEF DESCRIPTION OF THE DRAWINGS

FIG. 2 is a flowchart showing operations of the print job management apparatus;

FIG. 3 shows a user management screen displayed on a display device of an user interface unit of the print job management apparatus;

FIG. 4 shows a print confirmation screen displayed on the display device; and

DESCRIPTION OF THE EMBODIMENTS

Hereinafter, a print job management apparatus according to an embodiment will be explained with reference to the drawings.

Figure 1:
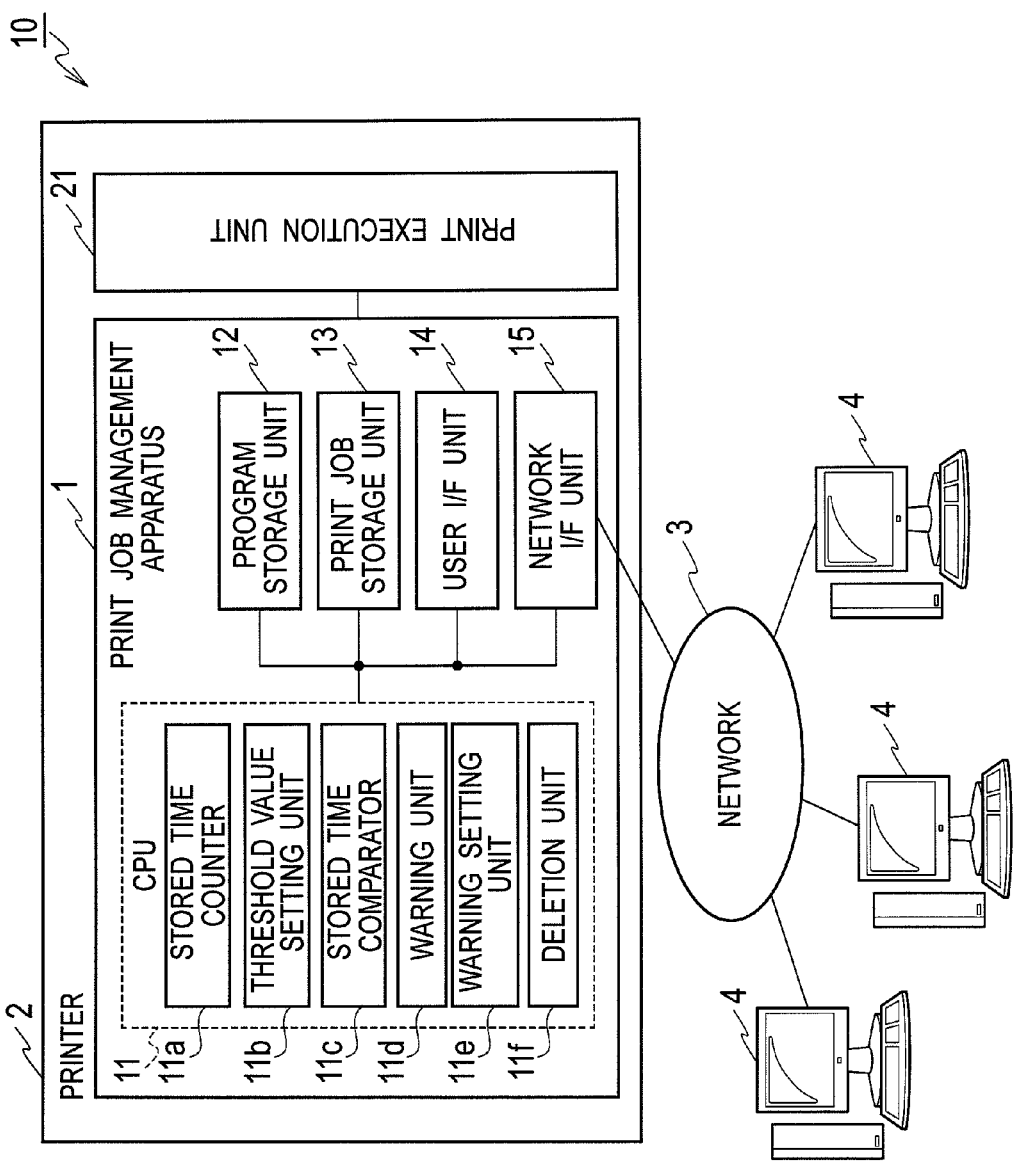
FIG. 1 is a block diagram of a print system including a printer provided with a print job management apparatus according an embodiment.

As shown in FIG. 1, a print system 10 includes a printer 2 such as an inkjet printer, a laser printer and an all-in-one printer, and client computers 4 connected with the printer 2 through a network 3. Each of the client computers 4 includes a CPU, memories, a HDD, a display, a network I/F and so on. Files made by the client computers 4 are sent to the printer 2 as print jobs through the network 3. The printer 2 includes a print job management apparatus 1 according to the present embodiment, and a print execution unit 21.

The print execution unit 21 includes a sheet supply unit, a sheet feed unit, a print unit, a sheet ejection unit and so on, and executes print processes based on commands from the print job management apparatus 1. The print job management apparatus 1 is installed in (integrated with) the printer 2. The print job management apparatus 1 stores a print job(s) sent from the client computer(s) 4 through the network 3 such as a LAN, and then makes the print execution unit 21 execute the print processes based on the stored print job(s) when a print command(s) is generated by a login user.

The print job management apparatus 1 includes a CPU 11, a program storage unit 12, a print job storage unit 13, a user I/F unit 14 and a network I/F unit 15. The program storage unit 12 includes a memory, a HDD or the like for storing a print job management program to be executed by the CPU 11 and so on. The print job storage unit 13 includes a memory, a HDD or the like for storing print jobs generated and then sent by the client computers 4 with respect to each user. In other words, the print job storage unit 13 functions as a spooler for storing print jobs temporarily. The user I/F unit 14 includes a display device such as an LCD with a touchscreen on which various screens as explained later can be displayed and through which numbers, texts and user's selections can be input, a reader that can read a user ID required for user authentication, and so on. The network I/F unit 15 is required for connection with the network 3.

The CPU 11 stores print jobs sent by the client computers 4 through the network 3 in the print job storage unit 13. The CPU 11 controls user authentication, and generates commands for printing the print jobs at the print execution unit 21. In addition, a stored time counter 11a, a threshold value setting unit 11b, a stored time comparator 11c, a warning unit 11d, a warning setting unit 11e and a deletion unit 11f are implemented in the CPU 11 as its functionality by executing the print job management program stored in the program storage unit 12.

The stored time counter 11a counts a stored duration time of each print job stored in the print job storage unit 13. The threshold value setting unit 11b sets, with respect to each user of the print jobs stored in the print job storage unit 13, a warning judgment threshold value used for judging whether or not to provide a warning to a user based on the stored duration time and a deletion threshold value that is set larger (longer) than the warning judgment threshold value.

The stored time comparator 11c judges whether or not the stored duration time counted by the stored time counter 11a exceeds the warning judgment threshold value set by the threshold value setting unit 11b with respect to each of the print jobs stored in the print job storage unit 13. In addition, the stored time comparator 11c also judges whether or not the stored duration time counted by the stored time counter 11a exceeds the deletion threshold value set by the threshold value setting unit 11b with respect to each of the print jobs stored in the print job storage unit 13.

The warning setting unit 11e makes an execution setting for a warning through the warning unit 11d based on a user's operation. The warning unit 11d outputs a warning for a print job(s) whose stored duration time exceeds the warning judgment threshold value based on the execution setting for the warning made by the warning setting unit 11e when it is judged by the stored time comparator 11c that the stored duration time exceeds the warning judgment threshold value. For example, the warning unit 11d provide a warning by displaying the print job(s) whose stored duration time exceeds the warning judgment threshold value in a more intensified manner (e.g. by highlighting them, by bold letters or the like) on the display screen than a displayed manner of print jobs whose stored duration times don't exceed the warning judgment threshold value. The deletion unit 11f deletes print jobs whose stored duration times exceed deletion threshold value when it is judged by the stored time comparator 11c that the stored duration times exceed the deletion threshold value.

Note that the program storage unit 12 and the print job storage unit 13 may be configured by a single memory or a single HDD. In addition, the print job storage unit 13 may be provided in the print execution unit 21 but not in the print job management apparatus 1.

Next, operations of the print system 10 including the print job management apparatus 1 will be explained with reference to a flowchart shown in FIG. 2.

First, the CPU 11 as the stored time counter 11a counts each stored duration time of print jobs stored in the print job storage unit 13 (step S100). Then, the CPU 11 displays a user management screen 14a as shown in FIG. 3 on the LCD of the user I/F unit 14 to prompt each user to enter a user's name, a warning judgment threshold value, (a deletion threshold value) and whether or not to display confirmation, and then sets them based on user's operations (step S110). When receiving a print job(s) sent by users from the client computer (s) 4 through the network 3, the CPU 11 stores the print job(s) in the print job storage unit 13 (step S120).

As shown in FIG. 3, on the user management screen 14a, displayed are a user's name input box 14a1, radio buttons 14a2 for selecting whether or not to display confirmation for printing a stored print job(s), a warning judgment threshold value input box 14a3 into which a warning judgment threshold value is input, and a deletion judgment threshold value input box 14a4 into which a warning judgment threshold value is input. A user fills the boxes and selects one of the radio buttons by using a keyboard and so on (not shown in FIG. 3) of the user I/F unit 14 as shown in FIG. 3. The CPU 11 sets the user's name, the warning judgment threshold value, the deletion threshold value and the selection of the display confirmation that are input by the user in the memory to store them.

Now, the explanation is returned to the flowchart shown in FIG. 2. The CPU 11 of the print job management apparatus 1 judges whether or not to approve a user authentication for a login to the printer 2 (step S130). Specifically, the user authentication is approved when the user indicates an authenticated IC card in which the user's name, his/her user ID number and so on are stored, or when the user inputs the user's name and a correct password through a user authentication screen (not shown) displayed on the user I/F Unit 14. Subsequently, the CPU 11 judges whether or not to approve a print authentication for printing the stored print job(s) stored in the print job storage unit 13 when the user requests the print authentication.

When the user authentications are approved (YES in step S130), the CPU 11 judges whether or not "Yes" was selected by the radio buttons 14a2 on the user management screen 14a shown in FIG. 3 (step S140). When it is judged that the "No" was selected (NO in step S140: the user doesn't require the display confirmation), the CPU 11 prints all print jobs generated by the user by using the print execution unit 21 with no warning for a print job(s) whose stored duration time exceeds the warning judgment threshold value even when the print job(s) whose stored duration time exceeds the warning judgment threshold value is included in all the print jobs (step S150). Therefore, a user who thinks such a warning bothersome can omit the display confirmation.

On the other hand, when it is judged that the "Yes" was selected (YES in step S140: a user requires the display confirmation), the stored time comparator 11c implemented in the CPU 11 judges whether or not there is a print job(s) whose stored duration time exceeds the warning judgment threshold value (step S160). Specifically, the stored time comparator 11c retrieves the warning judgment threshold value input through the user management screen 14a shown in FIG. 3 and compares the stored duration time of each of the print jobs generated by the user with the retrieved warning judgment threshold.

When there is no print job whose stored duration time exceeds the warning judgment threshold value (NO in step S160), the CPU 11 prints all the print jobs generated by the user by using the print execution unit 21 (step S150). On the other hand, when there is a print job(s) whose stored duration time exceeds the warning judgment threshold value (YES in step S160), the warning unit 11d implemented in the CPU 11 displays a print confirmation screen 14b shown in FIG. 4 on the LCD of the user I/F unit 14 for the user to select whether or not to confirm printing of the print job(s) whose stored duration time exceeds the warning judgment threshold value in addition to a print job(s) whose stored duration time doesn't exceed the warning judgment threshold value (step S170).

As shown in FIG. 4, the print confirmation screen 14b includes a message for the user (user A) to select whether or not to print out all the stored print jobs. Specifically, the message is [4 print jobs are remained in a memory, and 2 of them has been stored longer than 60 min.—To print out all the print jobs, press "Yes" button.—Not to print out all the print jobs, press "No" button. Selection screen will be opened to select print job(s) to be printed out.] as shown in FIG. 4, and the print confirmation screen 14b also includes a "Yes" button 14b1 and a "No" button 14b2 for the user to input his/her selection. Note that the print confirmation screen 14b is overlaid on a print job selection screen 14c explained later with reference to FIG. 5. However, the print confirmation screen 14b may be displayed independently from the job selection screen 14c.

Then, the CPU 11 judges whether or not the user selects the "No" button 14b2 (step S180). When the "Yes" button 14b1 is selected by the user (NO in step S180), the CPU 11 prints all the print jobs generated by the user by using the print execution unit 21 (step S150). On the other hand, when the "No" button 14b2 is selected by the user (YES in step S180), the CPU 11 displays the print job selection screen 14c shown in FIG. 5 on the LCD of the user I/F unit 14 for the user to select print job(s) to be printed out (step S190). On the print job selection screen 14c, the print job(s) whose stored duration time exceeds the warning judgment threshold value is shown in an intensified manner (i.e. highlighted in the present embodiment).

Figure 5:
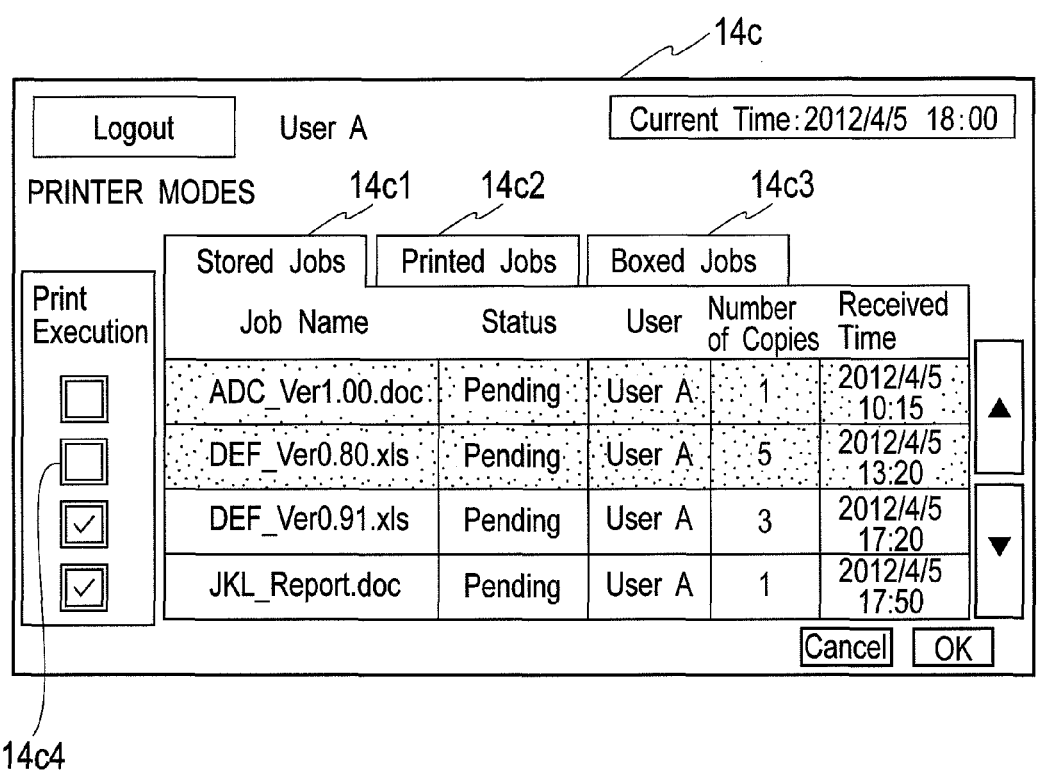
FIG. 5 shows a print job selection screen displayed on the display device.

As shown in FIG. 5, print jobs that were sent from the client computer(s) 4 through the network 3 based on user's operations and then stored (spooled) in the print job storage unit 13 are displayed in a stored job list 14c1 on the print job selection screen 14c. In addition, the print jobs whose stored duration time exceeds the warning judgment threshold value are highlighted in the stored job list 14c1 in order to be recognized easily by the user (user A).

In the stored job list 14c1, four print jobs "ADC_Ver1.00.doc", "DEF_$_{Ver}$0.80.xls", "DEF_Ver0.91.xls" and "JKL_Report.doc" are listed up. The statuses of the four jobs are "pending". The user who made the four jobs is the "user A". Similarly, the number of copies is set to "1", "5", "3" or "1" for each of the four print jobs. The time when each of the four print jobs was received by the printer 2 is also shown. The two print jobs "ADC_Ver1.00.doc" and "DEF_Ver0.80.xls" are highlighted because their stored duration time exceeds (is longer than) the warning judgment threshold (60 minutes). Here, the warning judgment threshold value (time) is "2012/4/5 17:00" that is 60 minutes before the current time "2012/4/5 18:00". Note that the stored job list 14c1 can be scrolled by pressing (touching) an "up" button or a "down" button located on the right when more print jobs are listed up in it.

In addition, a print execution checkboxes 14c4 are also provided on each left side of the stored print jobs. When a checkbox 14c4 of a print job is checked, the print job is selected to be printed out. Further, a "Printed Jobs" tab 14c2 and a "Boxed Jobs" tab 14c3 are also provided on the print job selection screen 14c. When the "Printed Jobs" tab 14c2 is pressed (touched), the stored job list 14c1 is switched over to a printed job list in which print jobs that has been printed out are listed up. When the "Boxed Jobs" tab 14c3 is pressed (touched), the stored job list 14c1 is switched over to a boxed job list in which print jobs that were box-saved are listed up. Box-saved print jobs are saved (stored) in a box virtually prepared in the memory of the printer 2, and are not printed out until they are manually operated by a user. Furthermore, a "Cancel" button and an "OK" button are also provided on the print job selection screen 14c. When the "OK" button is pressed (touched), the selection through the print execution checkboxes 14c4 is settled.

In the stored job list 14c1 shown in FIG. 5, each print execution checkbox 14c4 of the two print jobs "DEF_Ver0.91.xls" and "JKL_Report.doc" is checked to be printed out, and each print execution checkbox 14c4 of the two highlighted print jobs "ADC_Ver1.00.doc", "DEF_Ver0.80.xls" whose stored duration times exceed the warning judgment threshold value is unchecked. Note that, in order to cut out uncheck operations by a user, each print execution checkbox 14c4 of print jobs whose stored duration times don't exceed the warning judgment threshold value may be preliminarily (automatically) checked, and each print execution checkbox 14c4 of print jobs whose stored duration times exceed the warning judgment threshold value may be preliminarily (automatically) unchecked.

Now, the explanation is returned to the flowchart shown in FIG. 2 again. The CPU 11 waits until the "OK" button is pressed (touched) on the print job selection screen 14c, and then judges whether or not at least one print job is selected (at least one of the print execution checkboxes 14c4 is checked) in the stored job list 14c1 after the "OK" button is pressed (touched) (step S200). When at least one of the print jobs is selected to be printed out (YES in step S200), the CPU 11 sends a print command(s) together with data of the selected print job(s) to the print execution unit 21 to print out the selected print job(s) (step S210). On the other hand, when no print job is selected (all the print execution checkboxes 14c4 are unchecked) (NO in step S200), the CPU 11 terminates process flow of the flowchart shown in FIG. 2.

Note that, in the flowchart shown in FIG. 2, the processes of the steps S100 to S120 are not limited in the above order, and may be done concurrently, or done in a different order from the above order. In addition, since counting of the stored duration time of a print job(s) in the step S100 can be easily obtained by subtracting the received time of (or a start time for receiving) the print job(s) from the current time, it may be done in the step S160 together with comparing the stored duration time with the warning judgment threshold value.

The print job management apparatus 1 according to the present embodiment includes the print job storage unit 13 that stores print jobs generated based on user's operations with respect to each user, the stored time counter 11a that counts each stored duration time of the print jobs stored in the print job storage unit 13, the threshold value setting unit 11b that sets the warning judgment threshold value, the stored time comparator 11c that judges whether or not the each stored duration time exceeds the warning judgment threshold value set by the threshold value setting unit 11b by comparing the each stored duration time of the print jobs stored in the print job storage unit 13 with the warning judgment threshold value, and the warning unit 11d that provides the warning to a user of a print job(s) (by highlighting the print job(s)) when it is judged by the stored time comparator that the stored duration time of the print job(s) exceeds the warning judgment threshold value. Therefore, it can be prevented to erroneously print out the print job(s) stored for a long time.

The print job management apparatus 1 according to the present embodiment further includes the user I/F unit 14 that includes the display device (LCD), and the warning unit 11d provides the warning to the user of the print job whose stored duration time exceeds the warning judgment threshold value by displaying, on the display device (LCD), the print job whose stored duration time exceeds the warning judgment threshold value in a more intensified manner (by highlighting) than a displayed manner of print job whose stored duration time doesn't exceed the warning judgment threshold value. Therefore, it is possible for the user to recognize the print job whose stored duration time exceeds the warning judgment threshold value surely, and to select a print job to be printed out with referring to the print job displayed in the intensified manner.

In the print job management apparatus 1 according to the present embodiment, the threshold value setting unit 11b further sets the deletion threshold value, and the stored time comparator 11c further judges whether or not the each stored duration time exceeds the deletion threshold value set by the threshold value setting unit 11b by comparing the each stored duration time of the print jobs stored in the print job storage unit 13 with the deletion threshold value. Then, the warning unit 11d deletes a print job when it is judged by the stored time comparator 11c that the stored duration time of the print job exceeds the deletion threshold value. Therefore, it can be prevented more surely to erroneously print out the print job(s) stored for a long time.

The present invention is not limited to the above-mentioned embodiment, and it is possible to embody the present invention by modifying its components in a range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment. Scope of the present invention is determined in the context of the claims.

In the print job management apparatus 1 according to the above embodiment, by the warning unit 11d visually outputs the warning in the print confirmation screen 14b (by highlighting: see FIG. 4) on the LCD (touch screen) of the user I/F unit 14 or on a display device of the client computer 4 in order for the user to determine whether or not to print out the print job(s) whose stored duration time exceeds the warning judgment threshold value. However, a warning may be output by sounds (e.g. voices, beeps and so on) or the like by providing a speaker in the print job management apparatus 1.

The print job management apparatus 1 according to the above embodiment is installed in (integrated with) the printer 2 as show FIGS. 1 and 2. However, the print job management apparatus 1 may be provided independently from the printer 2. For example, the print job management apparatus 1 may be provided integrally with a print server on the network 3.

In the print job management apparatus 1 according to the above embodiment, the warning judgment threshold value is input by the user through the user management screen 14a (see FIG. 3). However, the warning judgment threshold value may be preliminarily (automatically) set by the print job management apparatus 1 in common for all users. The warning judgment threshold value may be preliminarily (automatically) set according to types of user's job, user's job grades or the like. Alternately, the print job management apparatus 1 may automatically judges properties such as priority levels, importance levels and confidential levels of print jobs, and determines the warning judgment threshold value for each of the print jobs according to the judged properties.

According to the flowchart shown in FIG. 2, each stored duration time is compared only with the warning judgment threshold value set by the threshold value setting unit 11b based on a value input into the warning judgment threshold value input box 14a3 on the user management screen 14a. In addition to the above-explained warning, the deletion unit 11f may delete a print job(s) whose stored duration time exceeds the deletion threshold value. In this case, the stored time comparator 11c compares each stored duration time of the print jobs with the deletion threshold value in addition to the comparison with the warning judgment threshold value in step S160, and automatically deletes the print job(s) whose stored duration time exceeds the deletion threshold value from the print job storage unit 13 in order not to print out the print job(s) whose stored duration time exceeds the deletion threshold value. Note that the deletion threshold value is set by the threshold value setting unit 11b based on a value input into the deletion threshold value input box 14a3 on the user management screen 14a in step S110. In the case of automatically deletion based on the deletion threshold value, a print job(s) to be deleted may be warned to a user before its deletion in order to prevent undesired deletion of a stored print job(s) that is not yet printed out but is needed to be still stored.

The present application claims the benefit of a priority under 35 U.S.C. §119 to Japanese Patent Application No. 2012-260816, filed on Nov. 29, 2012, the entire content of which is incorporated herein by reference.

What is claimed is:

1. A print job management apparatus comprising:
   a print job storage that stores print jobs generated based on user's operations with respect to each user;
   a stored time counter that counts a stored duration time for each of the print jobs stored in the print job storage that has yet to be printed, wherein the stored duration time is measured from a time of generation of each of the print jobs until execution of each of the print jobs;
   a threshold value setter that sets, with respect to the stored duration time for each of the print jobs stored in the print job storage, a warning judgment threshold value that indicates a set duration time for which the print job is stored in the print storage without printing;
   a stored time comparator that judges whether or not the each stored duration time exceeds the warning judgment threshold value set by the threshold value setter, by comparing the stored duration time for each of the print jobs stored in the print job storage that has yet to be printed with the warning judgment threshold value for an associated one of each of the print jobs; and
   a warning unit that provides a warning to a user of a print job when it is judged by the stored time comparator that a stored duration time of the print job exceeds the warning judgment threshold value of the associated print job, independently of the stored duration time of another print job of the same user.

2. The print job management apparatus according to claim 1, further comprising a user interface that includes a display device, wherein the warning unit provides the warning to the user of the print job whose stored duration time exceeds the warning judgment threshold value by displaying, on the display device, the print job whose stored duration time exceeds the warning judgment threshold value in a more prominent manner than a displayed manner of print job whose stored duration time does not exceed the warning judgment threshold value.

3. The print job management apparatus according to claim 1, wherein the threshold value setter further sets a deletion threshold value, the stored time comparator further judges whether or not the each stored duration time exceeds the deletion threshold value set by the threshold value setter by comparing each stored duration time of each of the print jobs stored in the print job storage with the deletion threshold value for an associated one of each of the print jobs; and the warning unit deletes a print job when it is judged by the stored time comparator that a stored duration time of the print job exceeds the deletion threshold value of the associated print job.

4. The print job management apparatus according to claim 1, wherein, when it is judged that the stored duration time of the print job exceeds the warning judgment threshold value, a confirmer is provided and enables printing of the print job for which the stored duration time exceeds the warning judgment threshold value and a print job for which the stored duration time does not exceed the warning judgment threshold value.

5. The print job management apparatus according to claim 4, wherein the confirmer comprises a print confirmation screen provided on a display device of the print job management apparatus.

6. The print job management apparatus according to claim 4, wherein the confirmer provides for the selective printing of all the stored print jobs or less than all the stored print jobs.

7. The print job management apparatus according to claim 6, wherein, when the confirmer is operated such that when less than all of the stored print jobs are to be printed, a display of all of the stored print jobs is provided.

8. The print job management apparatus according to claim 7, wherein the display of all of the stored print jobs includes an indication of the stored print jobs that have been selected for printing.

* * * * *